Nov. 1, 1927.　　　　　　　　　　　　　　　　　　　　1,647,274
C. M. CREWS
TYPEWRITING MACHINE
Filed April 26, 1923　　　　　2 Sheets-Sheet 1
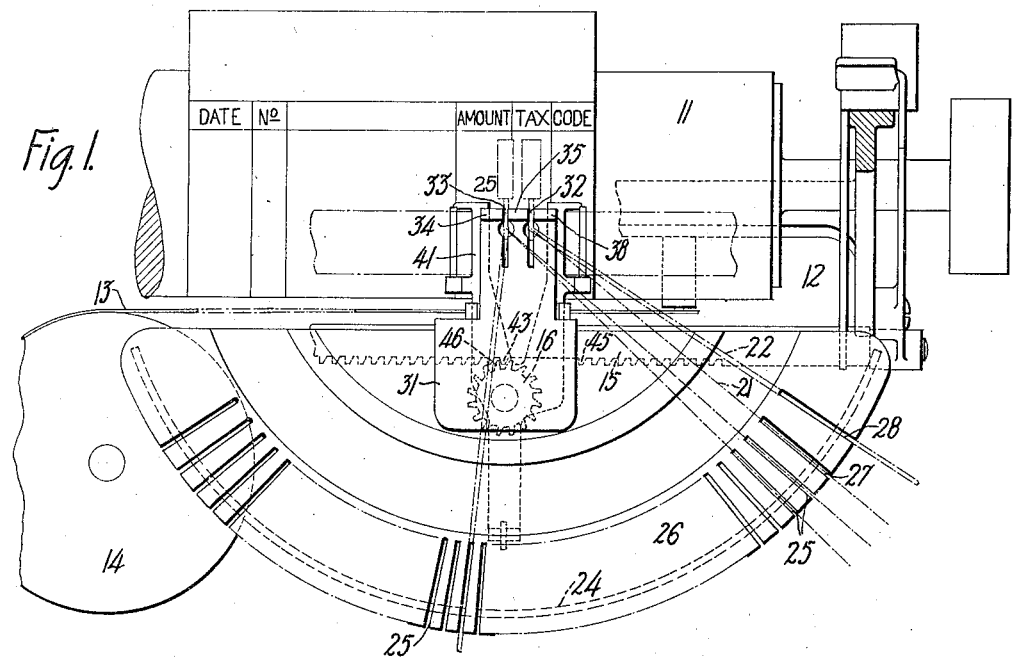
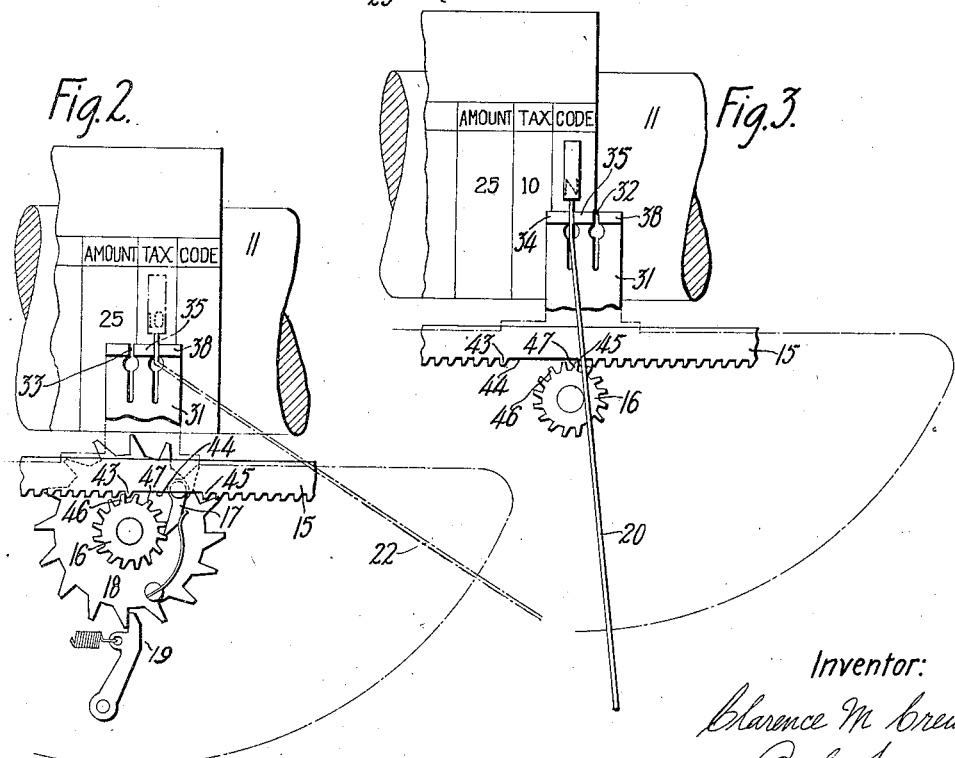
Inventor:
Clarence M Crews
by D. E. Stickney
Attorney

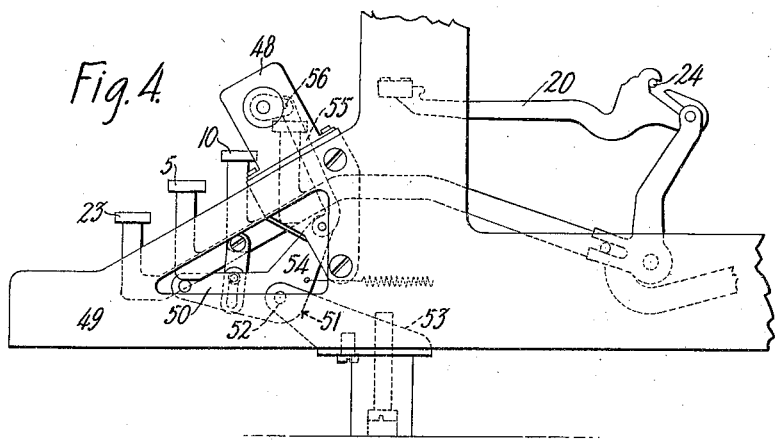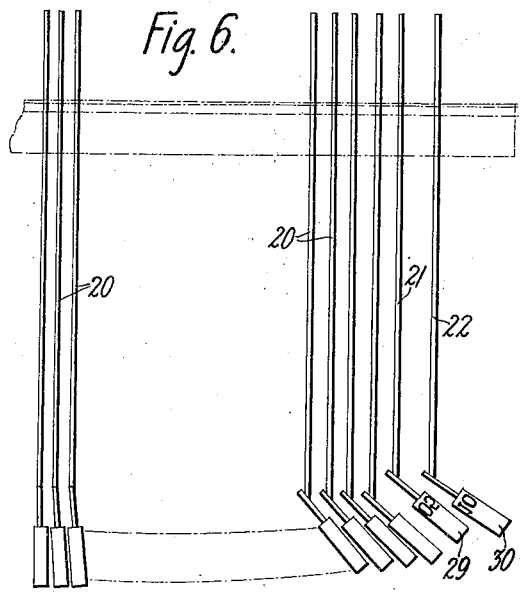

Patented Nov. 1, 1927.

1,647,274

UNITED STATES PATENT OFFICE.

CLARENCE M. CREWS, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

Application filed April 26, 1923. Serial No. 634,728.

This invention relates to machines for writing bills for telephone service, in which operation it is required to type in separate columns the date, the number of messages, the place called, the company's charge, the United States tax, and a code symbol. The principal object of the invention is to provide means for expediting the writing of these bills, and particularly for expediting the writing in the tax and code columns by causing the machine to space the company's charge column, the tax column and the code column automatically without attention from the operator. The invention is useful for other purposes.

The amount of the tax item is always either five or ten cents. Two special types are provided at the extreme right of the type-segment, one for writing "05" at a single stroke, and the other for writing "10" at a single stroke. The carriage is propelled in letter-feeding direction by the usual spring-drum. An escapement-rack on the carriage, having teeth at letter-space intervals, meshes with an escapement-pinion to control the letter-feeding movements of the carriage. Heretofore, provision has been made of an escapement-rack of this kind, having a gap in its teeth for automatically tabulating the carriage to the tax column, followed by a single tooth for arresting the carriage in the tax column, and then a second gap for automatically tabulating the carriage to the code column. Two teeth of the pinion normally engage the rack, however, so that each rack-tooth has two pinion-engaging positions, and two letter-feeding steps of the pinion are required to feed a rack-tooth past the pinion. In order to get the single rack-tooth past the pinion at one type-stroke, therefore, it was necessary to provide means for automatically lifting the rack out of engagement with the pinion at the writing of the tax item.

In accordance with the present invention, the company's charge column, the tax column and the code column are automatically spaced without lifting the escapement-rack away from the escapement-pinion.

All of the types, except the special "05" and "10" types, swing to a common printing point as usual, but the two special types are mounted to swing to a printing point two letter-spaces to the right of the printing point of the other types. The tax types, therefore, write in a column which is spaced two extra letter-spaces from the company's charge column, although the carriage has only the usual single letter-space advance following the writing of the last digit in the company's charge column.

In order to locate the carriage automatically for the writing of a code symbol in a column two letter-spaces to the right of the tax column on the sheet, the carriage is caused to jump automatically four extra letter-spaces at the writing of the tax item, thus bringing the desired columns of the sheet to the usual printing point. To this end, a gap is provided in the teeth of the escapement-rack, so located that it is brought opposite the escapement-pinion by the usual one-tooth advance of the pinion which follows the writing in the tax column. The carriage is unrestrained when this gap is reached, and therefore moves forward under the influence of the spring-drum until arrested by the engagement of the pinion with the first rack-tooth at the opposite side of the gap. The code symbol may then be written by a single key-stroke, and the carriage may be returned either manually or automatically for the beginning of a new line. In this way, the last digit of the company's charge item, the tax item and the code symbol are written by three successive type-strokes in three automatically separated columns, and this without the necessity of lifting the escapement-rack, and with only one jump of the carriage. Should it be unnecessary to write a tax item in any line, the carriage may be moved from the company's charge column to the code column by one actuation of the space-bar.

The ribbon-vibrator is made broader than usual so that the ribbon will cover both printing points, and two type-guides are provided, one for the types which swing to the usual printing point, and the other for the special tax-writing types.

The special types, which swing to the special printing point and are used exclusively for writing tax items, are located at the extreme right of the type-system, and therefore do not cross the paths of any of the other types in swinging to printing position. They are operated by special keys which are located at the extreme right of the keyboard. These special keys are connected to a register mounted at the right-hand side of the machine-frame and operate it to add the tax items.

Other features and advantages will hereinafter appear.

In the accompanying drawings,

Figure 1 is a fragmentary front sectional elevation of an Underwood typewriting machine embodying the present invention.

Figure 2 is a fragmentary front elevation, showing the parts in the positions occupied after the company's charge item has been written.

Figure 3 is a view, similar to Figure 2, showing the parts in the positions occupied with one of the letter-types swung to writing position in the code column.

Figure 4 is a fragmentary side elevation of the machine, showing the special keys and their connections to the register mechanism.

Figure 5 is a fragmentary plan view, showing the type-guide and ribbon-vibrator.

Figure 6 is a developed plan view, showing the arrangement of the types in the type-basket.

A platen 11 is rotatably mounted in a carriage 12, which is urged in a letter-feeding direction by means of a strap 13 connected at one end to the carriage 12 and at the other end to a spring-drum 14. Movement of the carriage 12 under the urging of the spring-drum 14 is controlled by suitable escapement-mechanism, comprising a rack 15 mounted on the carriage 12 to travel therewith and meshing with a pinion 16 having a one-way connection, through a spring-pressed pawl 17, with an escapement-wheel 18, which, in turn, is controlled by fixed and loose dogs (of which the loose dog 19 is shown), carried by a dog-rocker (not shown), which is operated by a universal bar (not shown), in the paths of the type-bars 20, 21 and 22.

The machine comprises the usual numeral and alphabet keys 23, and, in addition, a special tax-writing key 5 for writing "05" in the tax column, and a special tax-writing key 10 for writing "10" in the tax column. As has been stated, the bills which the machine is particularly designed to write comprise separate columns for the amount of the company's charge, the United States tax and the code symbol (see Figures 1 to 3), and it is desired to space each of the latter columns from the one preceding it automatically. The usual numeral and alphabet keys 23 all operate type-bars 20 mounted upon a fulcrum-wire 24 and guided in radial slots 25 in a type-bar segment 26, which are directed toward a common center below the usual printing point. The special keys 5 and 10 operate type-bars 21 and 22, respectively, which are also mounted upon the fulcrum-wire 24, but which are guided in slots 27 and 28 in the type-bar segment directed toward a center below a special printing point two letter-spaces to the right of the other printing point, and to which only the two special types 29 and 30 swing. The special type-bars 21 and 22 are somewhat shorter than the other type-bars 20, as seen in Figure 6, and swing in planes which are less inclined than would be the case if they were mounted to swing to the usual printing point. The heads of the types 29 and 30 are therefore less inclined to the body-portions of the type-bars 21 and 22, which enables them to make clearer impressions and to occupy less space in the type-basket. When the last digit of an item in the company's charge column is written, the pinion 16 turns one tooth-space permitting the carriage 12 to advance its usual single letter-space step, so that any of the usual types, if actuated next, would write in the next letter-space following said digit. Either of the special types 29 and 30, however, will write two extra letter-spaces to the right, thus spacing the tax column automatically from the company's charge column without any extra movement of the carriage.

For the purpose of guiding the special types 29 and 30 to printing position, the type-guide 31 is made with an extra guiding throat 32 in addition to the usual guiding throat 33 (see Figure 5). The guide-jaws 34 and 35 having surfaces 36 and 37 of the customary contour form the guide-throat 33 for guiding the usual types to printing position. The throat 32 for guiding the special types is formed by a jaw 38 having a guiding surface 39 of substantially the usual contour of the right half of a type-guide and by the jaw 35 having a surface 40 which need not be cut back substantially, since no types are to be guided by it from the left half of the type-system. The ribbon-vibrator 41 is made broad enough to cause the ribbon 42 to cover both of the printing points, and is operated and guided in the usual way upon the actuation of any of the types to raise the ribbon to cover the line of writing.

When a company's charge item has been written, the carriage will be in the position shown in Figure 2. The next operation of the machine will be the actuation of one of the tax-writing keys 5 and 10 to write in the tax column, as indicated in dotted outline in Figure 2, and it is desired to cause the code column of the work-sheet to be moved automatically to the usual printing point as an incident of the tax-writing operation. To this end, five teeth are omitted from the rack 15 to form a gap 44. When the parts have reached the position of Figure 2, a single rack-tooth 43 in advance of the gap 44 engages a single pinion-tooth 46 to connect the carriage to the escapement-mechanism. The ensuing actuation of a tax key will cause the pinion 16 to be rotated one tooth-space in a counterclockwise direction from the position of Figure 1 to that of Figure 3, withdrawing the pinion-tooth 46 from engagement with the rack, and permitting the carriage 12 to jump forward under the influence of the carriage-propelling spring-drum 14 until it is arrested by engagement of a rack-tooth 45 at the far side of the gap 44 with a tooth 47 of the pinion 16. It will be observed that the rack 15 reengages the next tooth but one of the pinion 16 to the tooth 46 last engaged prior to the jump. As a result of this, the five-tooth gap 44 is effective to cause only a four-tooth or four-letter-space jump. This jump is sufficient to bring the code column, which is two-letter spaces to the right of the tax column, to the usual printing point, so that the line may be completed by actuation of one of the usual type-keys to write in the code column.

The tax keys 5 and 10 are located at the extreme right end of the keyboard, and are connected to operate a register 48 mounted on the side of the machine-frame 49. The register 48 and the connections for operating it may be like the register and operating connections shown in the application of Henry L. Pitman, Serial No. 610,410, filed January 3, 1923, (now Patent No. 1,603,401, dated October 19, 1926), and are briefly as follows: An arm 50 of a bell-crank 51, pivoted at 52 upon a bracket 53 on the side of the machine-frame 49, is located in position to be depressed a short distance by the key 5, which engages it at its end, and to be depressed twice as far by the key 10, which engages it at its middle. The other arm 54 of the bell-crank 51, together with a link 55 connected at its upper end to a register-operating arm 56, forms a toggle arranged to be straightened and returned to its normal flexed position by the actuation of the key 5, and arranged to be straightened, flexed in the opposite direction, and returned to normal position by the actuation of the key 10. The register-operating arm 56 is thus reciprocated once by the operation of the key 5 and twice by the operation of the key 10. The register is arranged to add five at each reciprocation of the register-operating arm. It will be seen, therefore, that the register 48 is effective to add the items written by the tax keys 5 and 10.

The arrangement of the special types to swing to the special printing point reduces by one the number of tabulating movements required in each line, whether the rack is mutilated to cause automatic tabulation, as above described, or the usual manually-operated tabulating mechanism is employed for all of the jumps. Where the work is of such a nature that the special keys may be used for writing the last column on the page, they may be effective to reduce the travel of the carriage as well as reduce the number of tabulating jumps.

Variations may be resorted to within the scope of the invention, and portions of the improvements may be used without others.

Having thus described my invention, I claim:

1. In a typewriting machine, the combination with a set of types mounted to print at a common printing point, of a special type mounted to print at a different printing point at one side of the printing point of said set of types, a carriage, and mechanism for feeding the carriage one letter-space at each type-stroke, said carriage-feeding mechanism including means effective at a predetermined point in the line of writing, to feed the carriage a plurality of letter-spaces at a single type-stroke, for co-operation with said special type.

2. In a typewriting machine, a carriage, a main set of types mounted to swing to a common printing point, a special type mounted to swing to a special printing point at one side of the printing point of said main set of types, and means including a carriage-feeding mechanism for automatically effecting a tabulating movement at a predetermined position of the carriage upon actuation of the special type.

3. In a typewriting machine, a set of types, type-bars carrying the types, and a type-bar segment in which the type-bars are mounted having slots for guiding certain of the type-bars to a common center below a common printing point, and other slots for guiding others of the type-bars at the right of the type-bar system to a common center at the right of the first-mentioned center and below a printing point common to the types carried by the last-mentioned type-bars.

4. In a typewriting machine, a set of type-bars mounted to swing to a common center below a common printing point, and a second set of type-bars mounted to swing to a common center below another printing point.

5. In a typewriting machine, a carriage, a set of types for printing at a common printing point, a special type for printing to the right of said printing point, a pinion arranged to turn one-tooth space at each type-stroke, and a rack on the carriage in mesh with the pinion, said rack having a gap arranged to be brought opposite the pinion by the one-tooth space advance of the pinion following the actuation of the special type to cause the carriage to jump forward automatically to move the column in which the special type writes across the printing point of said set of types.

6. In a typewriting machine, a carriage, carriage-propelling means, a set of types arranged to swing to a common printing point, escapement mechanism controlling the advance of the carriage and comprising a rack on the carriage and a pinion located so as to have two of its teeth normally engaged with the rack, said pinion being arranged to be advanced one-tooth space at each type-stroke, and a special type mounted to print two letter-spaces to the right of the printing point of said set of types, said rack having a five-tooth gap located so as to be brought opposite the pinion by the one-tooth advance of the pinion caused by the actuation of the special type, said gap being effective to cause the carriage to jump forward four letter-spaces and to be arrested by engagement with the next pinion tooth but one to the tooth last engaged prior to said jump.

7. In a typewriting machine, a type-segment, a set of types mounted at one side of the segment to swing to a common printing point, a type-guide having a guiding throat for guiding said types to the printing point, said throat being formed by two jaws, one of which extends forward and outward from the printing point, and the other of which extends substantially directly forward from the printing point.

8. In a typewriting machine, the combination of a power-driven carriage, a complement of type-bars having a normal printing position and a uniform carriage-feeding means operative up to a predetermined point along the line of print, a special type-bar having its printing position offset in advance of the normal printing position to normally type within a spaced-off column area, said special type-bar for operation at the predetermined point, to type within the spaced-off area and then operate the carriage-feeding means to skip the special typed column past the normal printing position and arrest the carriage with a third column area at the normal printing position.

CLARENCE M. CREWS.